(No Model.)
W. F. SUMNER.
TWO WHEELED VEHICLE.
No. 474,197. Patented May 3, 1892.
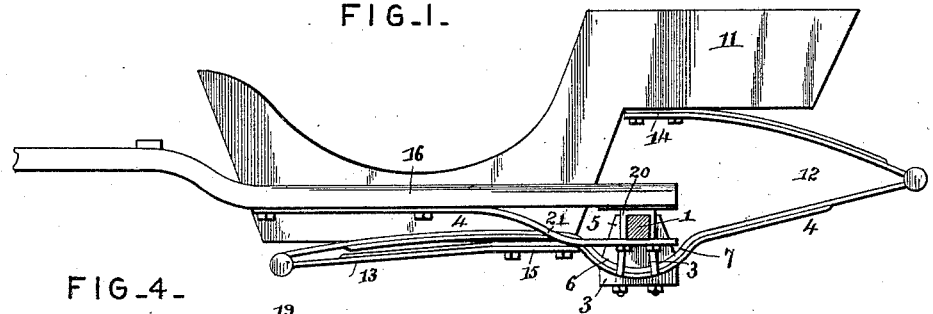
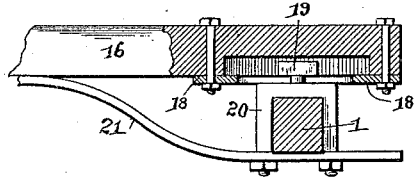
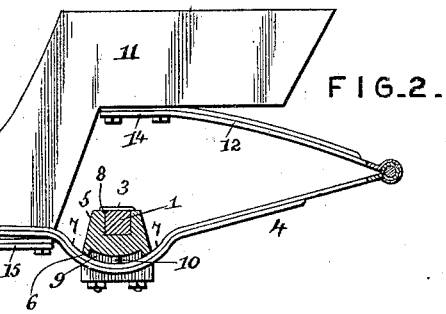
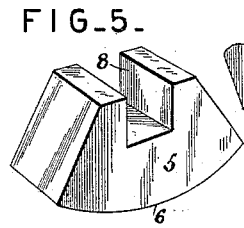
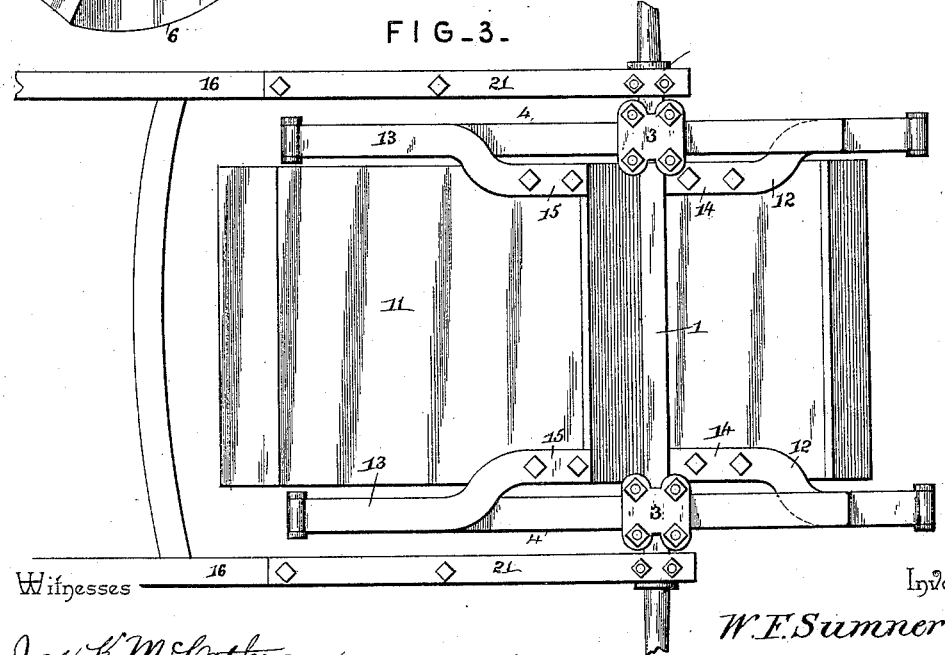
Witnesses
Jas. K. McCathran
N. F. Riley
Inventor
W. F. Sumner
By his Attorneys,
C. A. Snow & Co.

UNITED STATES PATENT OFFICE.

WILLIAM F. SUMNER, OF WEST VALLEY, NEW YORK.

TWO-WHEELED VEHICLE.

SPECIFICATION forming part of Letters Patent No. 474,197, dated May 3, 1892.

Application filed August 4, 1891. Serial No. 401,660. (No model.)

*To all whom it may concern:*

Be it known that I, WILLIAM F. SUMNER, a citizen of the United States, residing at West Valley, in the county of Cattaraugus and State of New York, have invented a new and useful Two-Wheel Vehicle, of which the following is a specification.

The invention relates to improvements in two-wheeled vehicles.
The object of the present invention is to simplify and improve the construction of two-wheeled vehicles, to enable the body to be adjusted to any-sized horse and keep the cart in perfect balance, to construct narrow bodies and at the same time arrange the springs close to the shafts to avoid springing the axle, and to do away with all horse motion and prevent the same being communicated to the occupant of the vehicle.
The invention consists in the construction and novel combination and arrangement of parts hereinafter fully described, illustrated in the accompanying drawings, and pointed out in the claims hereto appended.
In the drawings, Figure 1 is a side elevation of a two-wheeled vehicle embodying the invention. Fig. 2 is a vertical sectional view taken longitudinally of the springs. Fig. 3 is a reverse plan view. Fig. 4 is a detail sectional view illustrating the manner of attaching the shafts to the axle. Fig. 5 is a detail perspective view of one of the spring-blocks.

Referring to the accompanying drawings, 1 designates an axle, to which are secured by clips 2 and tie-plates 3 longitudinal leaf-springs 4, and interposed between the axle and the longitudinal springs 4 are spring-blocks 5, which are constructed of metal and have their bottoms 6 curved and conforming to a curved depression 7 in each longitudinal spring at a point intermediate the ends of the same. The tops of the blocks 5 are provided with rectangular transverse recesses 8 to receive the axles 1, and the bottoms are provided with longitudinal grooves 9, which are engaged by lugs 10 on the upper faces of the curved depressions 7 of the longitudinal springs 4, whereby the longitudinal springs are adapted to be moved longitudinally to adjust a body 11 to suit any-sized animal. The body 11 is connected with the longitudinal springs by front and rear end springs 12 and 13, and by loosening the clips 2 and moving the springs 4 slightly forward the front of the body 12 will be raised, and at the same time the weight will be thrown back of the axle, thus enabling the cart or vehicle to be properly balanced.

The front end springs 12 have their inner ends secured to the bottom of the foot-board of the body and their outer ends are secured to the front ends of the longitudinal springs and they are arranged beneath the latter. The rear end springs are arranged above the longitudinal springs and have their inner ends secured to the bottom of the seat and their outer ends connected to the rear ends of the longitudinal springs. The inner ends 14 and 15 of both the front and rear end springs are curved laterally inward, whereby a narrow body may be employed and the springs arranged close to the shafts to avoid springing the axle.

The shafts 16 of the vehicle are provided at their rear ends and in their lower faces with recesses 17 and have secured over the recesses plates 18, which are provided with longitudinal slots and are engaged by T-shaped lugs 19 or clips 20. The clips 20 secure the shafts to the upper face of the axle and fasten the rear ends of shaft-springs 21 to the lower face of the axle, and the said shaft-spring 20 has its front ends secured to lower face of the shaft. This construction produces a solid coupling or connection, which does away with horse motion and prevents the same being communicated to the occupants of the vehicle.

It will readily be seen that vehicles constructed in accordance with this invention are simple and inexpensive, may be readily adjusted to suit any-sized animal and to keep it properly balanced, and that horse motion is prevented being communicated to the occupants.

What I claim is—

1. In a vehicle, the combination of an axle, a body, longitudinal springs clipped to the axle and supporting the body and provided intermediate their ends with curved depressions, and the spring-blocks interposed between the axle and the springs and adjustably securing the latter to the former and provided in their tops with recesses to receive the axle and having their bottoms curved and conforming to the depressions of the springs, substantially as described.

2. In a vehicle, the combination of an axle, a body, the longitudinal springs clipped to the axle and provided intermediate their ends with curved depressions and having lugs on the upper faces of the same, and the spring-blocks adjustably securing the springs to the axle and provided in their tops with recesses to receive the axle and having their bottoms curved and provided with grooves to receive the said lugs, substantially as described.

3. In a vehicle, the combination of an axle, a body, longitudinal springs clipped to the axle, and the end springs connected to the longitudinal springs and extending inward therefrom and arranged at the front and the back of the body and having their inner ends curved laterally inward under the body and secured to the same, substantially as and for the purpose described.

4. In a vehicle, the combination of an axle, a shaft provided with a recess, a plate secured to the shaft and having a longitudinal slot, a clip securing the shaft above the axle and provided with a T-shaped lug to engage said plate, and a spring having its rear end secured to the lower face of the axle and its front end secured to the shaft, substantially as described.

In testimony that I claim the foregoing as my own I have hereto affixed my signature in presence of two witnesses.

WILLIAM F. SUMNER.

Witnesses:
ELSBRA J. SMITH,
J. S. MALONEY.